COMPUTER CONTROLLED FILE PROTECT

Filed Jan. 7, 1960 2 Sheets-Sheet 1

INVENTORS
EARL D. BARKHUFF
HENRY E. CHILDS
FREDERICK A. SCHULTZ
DONALD N. STREETER
BY
SUGHRUE, ROTHWELL, MION & ZINN
ATTORNEYS

United States Patent Office 3,199,091
Patented Aug. 3, 1965

3,199,091
COMPUTER CONTROLLED FILE PROTECT

Earl D. Barkhuff, Henry E. Childs, Frederick A. Schultz, and Donald N. Streeter, all of Poughkeepsie, N.Y., assignors to International Business Machines Corporation, New York, N.Y., a corporation of New York
Filed Jan. 7, 1960, Ser. No. 1,002
7 Claims. (Cl. 340—174.1)

This invention relates to magnetic recording systems and more particularly to a means for controlling the erasing function in connection therewith.

In an information handling system employing a computer where magnetic tapes are used, these tapes are housed in tape cartridges. Means are provided for storing a plurality of these cartridges each with a discrete address. A tape transport receives an addressed cartridge. A conventional tape transport contains transducers for reading, writing, and erasing data on the tape. The tape transport can also locate the end of a record, the end of a file of records, and the end of the tape itself. Special coded characters may be written onto the tape to indicate these tape positions. A typical magnetic recording system employing a tape transport functioning as above described is shown and described in the copending application of Theodore G. Floros, application Serial No. 849,919, filed October 30, 1959, now Patent No. 3,009,637 entitled Locating End of File.

Broadly speaking, for the purposes of this invention, the tape data may be classified into two broad classes (1) master and (2) non-master. Some tapes may contain only master data, others some master data and some non-master data and still others all non-master data. In the case of master data, special care must be taken that it is not inadvertently erased. This can be done by decommissioning the erase circuits in the recording system at appropriate times.

In accordance with this invention such decommissioning is achieved under control of either the computer or the tape itself. A push-push switch controller operated by a solenoid actuator has a file protect ON (FP ON) position in which the erase circuits are decommissioned and a file protect OFF (FP OFF) position in which the erase circuits are not decommissioned. The solenoid actuator is placed in operating relation to this controller so that control signals to the solenoid place the push-push switch in either the FP ON or FP OFF position. The push-push controller is mounted on the tape cartridge and includes a two-position push-button. The solenoid is mounted to the tape transport and its actuator is placed in operating relation to this pushbutton. A micro switch controlling the decommissioning and commissioning of the erase circuits may also be mounted to the tape transport and includes a sensing arm which is biased toward the pushbutton to sense its position. A mechanical mechanism which functions as a suitable push-push switch controller which may be employed is manufactured and sold by Donald Mossman Co.

When writing on the tape, an FP ON character is written at least at the end of each tape having any master data thereon and an FP OFF character at the end of the tape having all non-master data thereon. In the case of master data at the beginning of the tape followed by non-master data, an FP ON character is written along with an end of file (EOF) signal immediately following the master data. This in turn is followed by an FP OFF character. Following the FP OFF character is the non-master data. At the end of the tape is placed another FP ON character. Simultaneously with this writing the solenoid is pulsed with the FP ON or FP OFF signals, as the case may be, so that the push-push controller finds itself at the end of the tape in the correct FP ON or FP OFF position. Upon readback of each tape the solenoid actuator may be controlled by the tape. Means are also provided for superimposing under selected conditions control of the solenoid by the computer itself. Under some circumstances it may be desirable to insure that the push-push controller associated with selected cartridges is always in the FP ON position. This is done by means, to be explained later, for rigidly holding the push-push controller in its FP ON position.

It is therefore an object of this invention to provide a novel means for preventing inadvertent erasure of master data on a magnetic tape.

It is a more specific object of this invention to provide such a novel means where control is achieved from the computer or the tape itself.

Another specific object of the invention is to provide such a novel means in which said means includes a solenoid having an actuator the movement of which is controlled by signals received from the computer or the tape.

These and other objects will be apparent from a more detailed description of the accompanying drawings.

Figures 1, 1A:
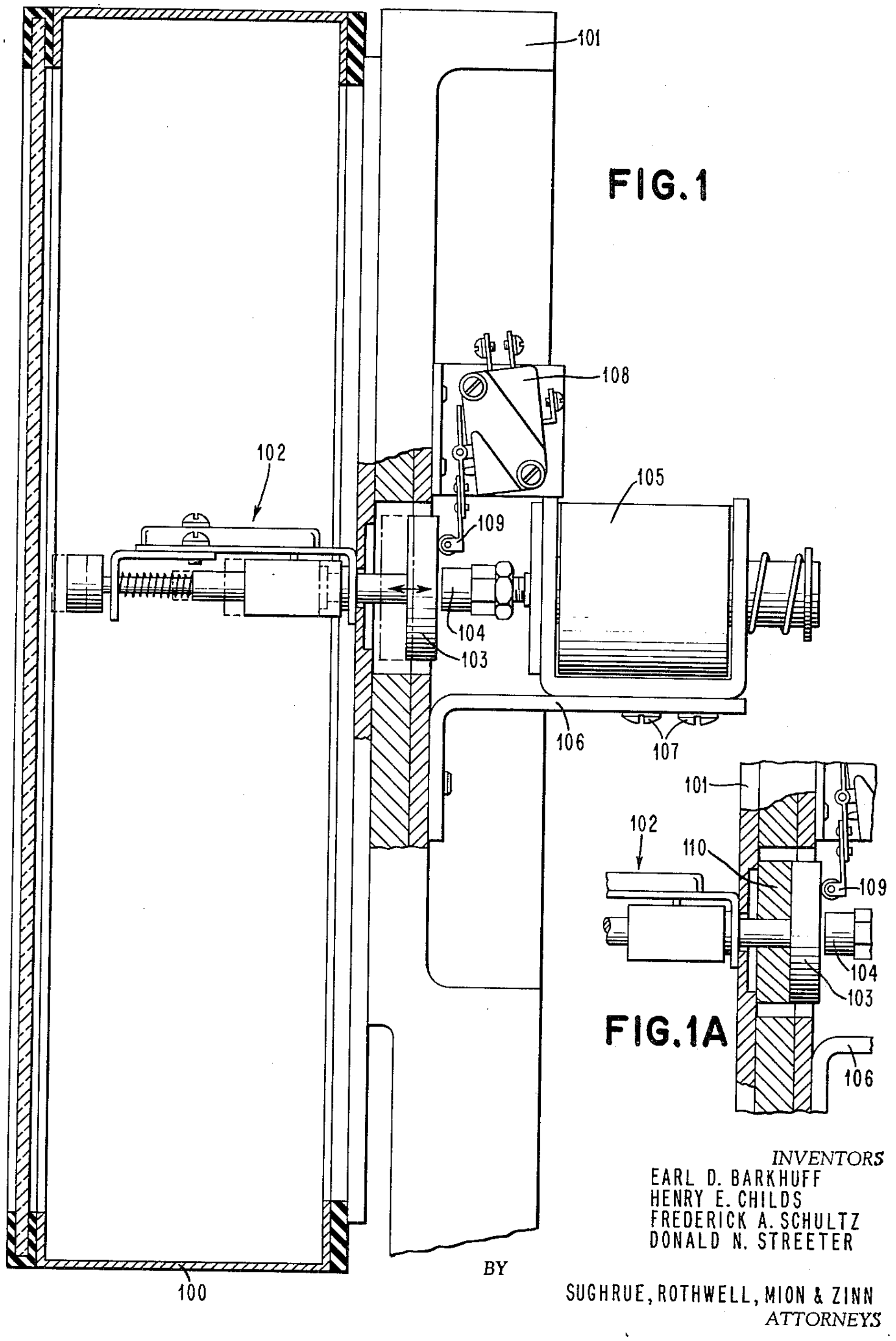
FIGURE 1 is a view partly in section of a tape cartridge in operating relation to a tape transport with associated erase circuit controls assembled in accordance with this invention.
FIGURE 1A is a fragmentary view, partly in section, of FIGURE 1.

Now turning to FIGURE 1, a tape cartridge 100 of a conventional type contains a magnetic tape (not shown). The cartridge is received in a conventional tape transport 101. Mounted on the cartridge 100 in any conventional manner is a push-push switch controller 102. The switch controller 102 has a control surface or push button 103 which, as shown in this figure, is in its out position. The dotted lines indicate the position of the push button in its in position. In its out position, for the purposes of this invention, file protect is ON. In its in position, for the purposes of this invention, file protect is OFF. The controller 102 by alternate lateral movements induced by the actuator 104 of the solenoid 105 moves between its two latched positions, namely, file protect ON and file protect OFF.

Mounted to the tape transport 101 is the solenoid 105. It is so mounted by L shaped member 106 to which the solenoid is mounted by bolts 107. Also mounted to the tape transport is a micro switch 108. This micro switch, as will be explained in connection with FIGURE 2, contains a plurality of contacts for controlling the erase circuits and the energization of the solenoid 105. These contacts are operatively connected to a sensing arm 109. This arm is normally biased against the push button 103 when said push button is in its out position. As the push button 103 moves to its in position the sensing arm 109 follows the movement thereof, at least far enough to change the condition of the contacts within the micro switch 108.

Figure 2:
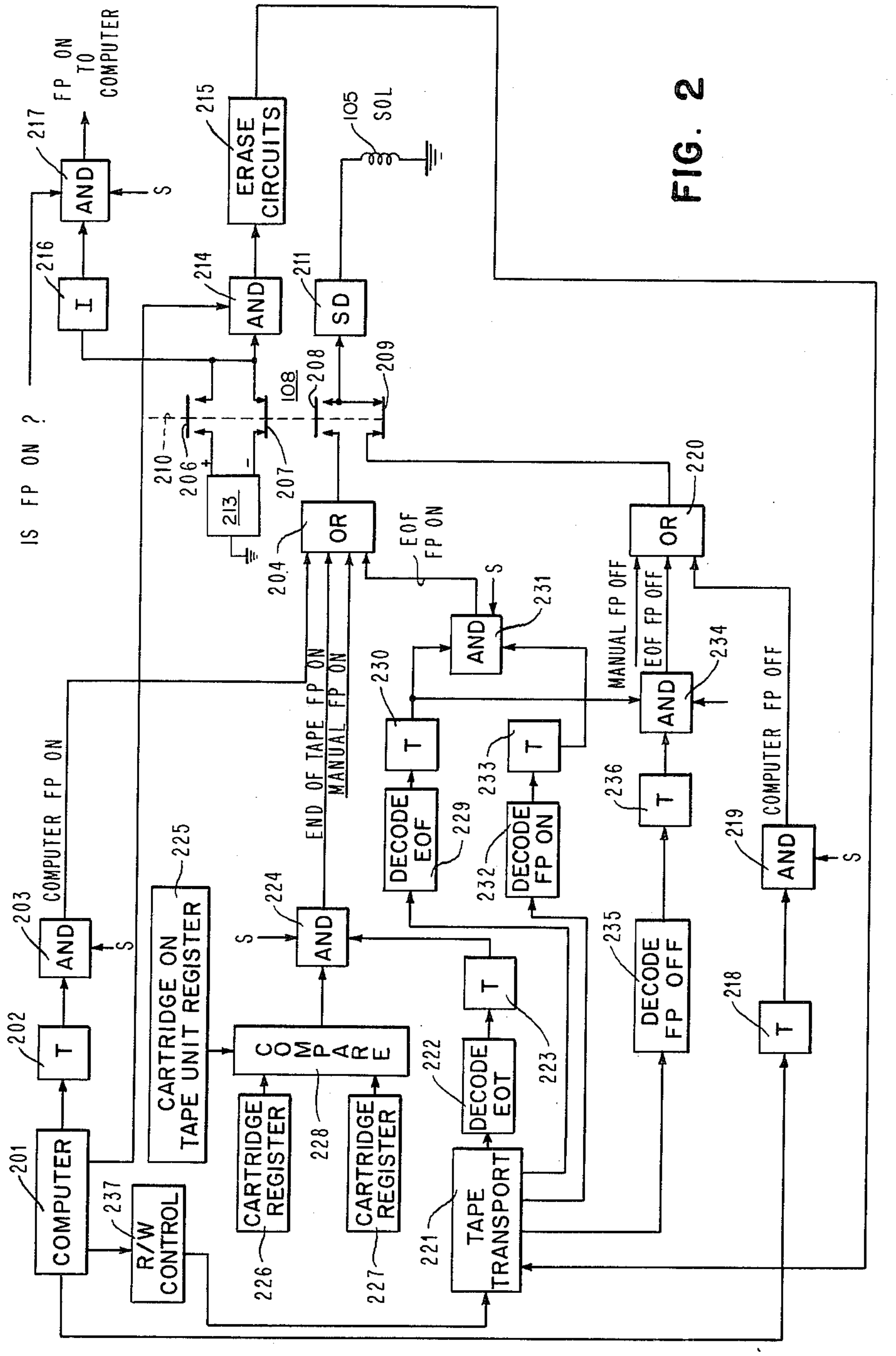
FIGURE 2 is a diagrammatic representation of the control circuitry employed in accordance with this invention.

As the solenoid 105 is pulsed by means to be shown in connection with FIGURE 2 the actuator 105, which is aligned with the push button 103, urges the push button into alternate in and out positions. The movement of the push button 103 in turn controls the position of the sensing arm 109 and consequently the contacts of the micro switch 108.

As shown in FIGURE 1A, it may be necessary under some conditions to insure that the push button is mechanically prevented from being actuated by the solenoid. This is done by positioning some means such as a spring clip 110 between the tape transport 101 and push button 103. In this event the solenoid cannot move the push-push switch controller to its in position, and consequently, file protect is always ON.

Referring now to FIGURE 2 there is shown a means of commissioning and decommissioning the erase circuits. As previously stated one means of controlling the commissioning and decommissioning of the erase circuits is achieved through the computer itself. The computer 201 may be programmed so as to provide at selected times an FP ON signal. This signal is fed to trigger 202 which conditions AND gate 203. A sample pulse S samples the condition of this AND gate 203 and provided the computer has generated the FP ON signal, this AND gate 203 will provide a pulse at its output at sampling time which is fed to OR gate 204. The micro switch referred to in FIGURE 1 is generally indicated in this figure as 108. In the position shown here this micro switch is in the FP ON position. It is placed in this position by virtue of the fact that the push button 103 of FIGURE 1 is in the out position. The micro switch has a plurality of contacts schematically indicated as 206, 207, 208 and 209. They are all mechanically ganged by the mechanical linkage 210. In the position as shown there is an open circuit between the output of the OR gate 204 and the solenoid driver 211. Consequently, an FP ON signal from the computer has no effect on the solenoid 105. However, there is a closed circuit between the power supply 213 and one input to AND gate 214. Contact 207 closes the circuit between the negative side of the power supply 213 and this input to the AND gate 214. Consequently, AND gate 214 is blocked. The output of AND gate 214 to the erase circuits 215 provides an inhibit signal thereto to decommission the erase circuits. The erase circuits control the erase function of tape transport 221. The read/write functions thereof are controlled by the R/W control 237. An inadvertent erase signal will not energize the erase circuit. At the same time the negative side of the power supply 213 is connected through contact 207 to the input to inverter 216. The output of inverter 216 being up conditions AND gate 217. In order to check that the erase circuits are inhibited the computer generates a signal IS FP ON? This signal is also fed to AND gate 217 which is unblocked at sample time by sample pulse S to provide a signal to the computer indicating that the file protect is ON and that the erase circuits are inhibited.

If now we assume that the micro switch is in a condition where file protect is OFF then the switch 108 is moved in a vertical down position. Contact 208 provides a closed circuit between the output of OR gate 204 and the solenoid driver 211. An FP ON signal from the computer through OR gate 204 will by virtue of the solenoid driver 211 actuate the solenoid 105. The actuator of the solenoid will strike the push button 103 in FIGURE 1 causing it to move from its in position to its out position. The micro switch then sensing the out position of the push-push switch controller will move the linkage 210 to move the contacts of switch 108 in a vertical up direction. This as has been explained previously results in inhibiting of the erase circuits.

The computer may also generate an FP OFF signal which is fed to trigger 218. The output of trigger 218 is fed to AND gate 219 and when sampled provides the signal FP OFF. This FP OFF signal is fed to OR gate 220 and the output thereof is fed to the contacts of the switch 108. With contact 209 of the micro switch in the position as shown in this figure the solenoid driver energized the solenoid 105 to move the actuator against the push button, moving said push button to its in position. The contacts of switch 108 then move in a vertically down direction resulting in the conditioning of AND gate 214 by connecting the positive side of the power supply 213 through contact 206 to one input thereof. An erase signal from the computer through AND gate 214 will energize the erase circuits. At the same time the positive side of the power supply 213 is connected to the inverter 216 which provides a down level at the output thereof to AND gate 217 to block this AND gate.

Thus far there has been discussed the means of commissioning or decommissioning the erase circuits through the computer by programming. As previously discussed this control may be achieved through the tape itself. The tape, as it is well known, may have a plurality of coded characters thereon. One such signal may be END OF TAPE. When such a signal is read by the tape transport unit 221 it is decoded by the decoder 222 and fed to the trigger 223. This signal will set the trigger 223 to condition AND gate 224. The address of the tape cartridge being read is stored in the register 225. Additionally the address of all cartridges which contain master information on the tapes thereof are stored in a plurality of registers 226 and 227. If the particular cartridge being processed at the time, whose address is stored in register 225, is a cartridge having master data thereon, as indicated by one of the registers 226, 227, the compare circuit 228 will so indicate and condition AND gate 224. Consequently at sample time AND gate 224 is unblocked to provide the signal END OF TAPE FP ON. This signal is fed to OR gate 204. If at this time file protect is OFF then the output of OR gate 204 by virtue of this signal will energize the solenoid 105 to cause the push-push switch controller to obtain a file protect ON position. If at this time file protect is already ON, no change is initiated.

Another signal which may be generated by the tape is the END OF FILE (EOF) signal. In conjunction with this EOF signal the tape may generate either an FP ON or FP OFF signal. The FP ON and FP OFF signals are special coded characters which may for instance be generated simultaneously with the EOF signal. Turning first to the EOF-FP ON signal the tape unit will first of all detect the presence of the EOF signal which is decoded by the decoder 229 to SET trigger 230 and thereby condition AND gate 231. If in conjunction with this EOF signal there is also generated an FP ON signal then decoder 232 will SET trigger 233 and further condition AND gate 231. AND gate 231 is unblocked at sample time to provide the EOF-FP ON signal to OR gate 204.

The condition of trigger 230 indicative of the EOF signal is also fed to AND gate 234. If in conjunction with EOF there is also generated the FP OFF signal, the decoder 235 will SET trigger 236 to condition AND gate 234 which at sample time will then provide the EOF-FP OFF signal to OR gate 220.

In addition to the generation of the control signals for the erase circuit by the computer and the tape itself there is also provided a manual FP ON signal which is fed to OR gate 204 and the manual FP OFF signal which is fed to OR gate 220. These signals may be generated by any conventional means such as a manually operated switch.

Thus far it has been shown where the commissioning and decommissioning of the erase circuits may be controlled by the computer or by the tape itself, and it is to be understood that any technique capable of erasing data is comprehended within this specification. Additionally means have been described in which a manual switch may be thrown to control the erase circuits. Some conditions may exist wherein the tape in the tape transport being processed by the computer may contain master information at the beginning of the tape and non-master information at the end of the tape. Also in connection with such a circumstance it may be necessary to read the master data and then the non-master data and rewind the tape back to the master data and start the reading process over again. In such a circumstance, the tape may contain the master data, followed by an EOF-FP ON signal, followed by an FP OFF signal and then the non-master data. It can be seen then that one may read the master data and provide the file protect ON signal at the end thereof followed by the file protect OFF signal and thence to the non-master data and upon rewinding the signals are provided in reverse. First file protect is OFF and then file protect is ON so that the rewind to the master data finds the file protect ON.

What has been described is one embodiment of the present invention. Other embodiments obvious from the teaching herein are contemplated to be within the scope of the following claims.

What is claimed is:

1. In a computer system including a magnetic tape unit having a cartridge for carrying a magnetic tape therein and a tape transport for receiving said cartridge, an erase circuit for coaction with said magnetic tape, a two position erase circuit control switch mounted on said transport for controlling the commissioning of said erase circuit in a first position and the decommissioning of said erase circuit in a second position, a two position switch controller mounted on said cartridge in operating relation to said control switch whereby when said controller is in a first position said control switch is in its first position and when said controller is in its second position said control switch is in its second position, a solenoid including an actuator mounted on said transport, said actuator being in a position to operate said controller to change the position of said control switch when said solenoid is energized, and means under control of said computer for energizing said solenoid.

2. In a magnetic recording system for reading, writing and erasing master and non-master data on a magnetic tape carried by a tape cartridge, a write control circuit for controlling the writing of said master and non-master data on said tape along with significant characters associated therewith, a read control circuit for controlling the reading of said data and significant characters, an erase circuit for coaction with said magnetic tape, a tape transport for receiving said tape cartridge, a two position erase circuit control switch mounted on said tape transport for controlling the commissioning of said erase circuit in a first position and the decommissioning of said erase circuit in a second position, a two position switch controller mounted on said cartridge in operating relation to said control switch whereby when said controller is in a first position said control switch is in its first position and when said controller is in its second position said control switch is in its second position, a solenoid including an actuator mounted to said tape transport, said actuator being in a position to operate said controller to change the position of said control switch when said solenoid is energized and means under control of said tape data for energizing said solenoid.

3. In a magnetic recording system including a plurality of magnetic tape cartridges containing magnetic tapes therein, at least some of said tapes having master data recorded thereon, said master data tape cartridges having discrete addresses associated therewith, an erase circuit for coaction with said magnetic tapes, a two position erase circuit control switch for controlling the commissioning of said erase circuit in a first position and the decommissioning of said erase circuit in a second position, a two position switch controller mounted on said cartridge in operating relation to said control switch whereby when said controller is in a first position said control switch is in its first position and when said controller is in its second position said control switch is in its second position, a tape transport for receiving addressed cartridges, an electromagnetic means including an actuator mounted to said tape transport, said actuator being in a position to operate said controller to change the position of said control switch when said electromagnetic means is energized, a plurality of registers for storing addresses of master data tape cartridges, and means under control of said registers for energizing said electromagnetic means.

4. A file protection recording and erasing control device for use in a magnetic tape system of the type in which intelligible magnetic patterns on a magnetic tape are recorded and sensed by tape handling apparatus, said apparatus including means for controlling the erasing of magnetic patterns on said tape, the tape being disposed in a plurality of cartridges which are adapted to be selectively received in operating relation by said tape handling apparatus, each cartridge being identified by a coded designation, comprising: means for erasing magnetic patterns from said tape; a plurality of first storage means for storing the coded designations of one or more of said cartridges, said stored designations defining cartridges containing tape which is not to be erased; a second storage means for storing the coded designation of the one of said cartridges selected for receipt in operative relation by said tape handling apparatus; comparing means responsive to said first and second storage means for designating the concurrent presence of identical coded designations in said second storage means and in any one of said first storage means; and disabling means responsive to said comparing means for rendering said erasing means inoperative.

5. A magnetic tape unit having a cartridge for carrying a magnetic information bearing tape therein and a tape transport for receiving said cartridge, an erase circuit for coaction with said magnetic tape, a two-position erase circuit control switch mounted on said transport for controlling the commissioning of said erase circuit in a first position and the decommissioning of said erase circuit in a second position, a sensing arm operatively cooperating with said control switch and normally biased in said first position of said control switch, a two-position switch controller mounted on said cartridge, a movable control surface cooperating with said switch controller and operatively engaging said sensing arm of said control switch such that when said controller is in a first position said control switch is in its first position and when said controller is in its second position said control switch is in its second position, a solenoid including an actuator mounted on said transport, said actuator being aligned with said control surface to operate said controller to change the position of said control switch when said solenoid is energized and means responsive to the information contained on said magnetic tape for controlling the energization of said solenoid.

6. A magnetic tape unit as defined in claim 5 further including a clip means which may be engaged with said control surface to rigidly hold said controller in a predetermined one of said two positions.

7. A file protection erase control device for use in a magnetic tape system of the type in which intelligible magnetic patterns on a magnetic tape are recorded and sensed by a tape handling apparatus, the tape having data arranged in groups, selected ones of which are identified by coded designations manifested on the tape for defining groups containing data which is not to be erased, comprising:

(a) means for controlling the erasing of magnetic patterns on a tape in response to the sensing of a coded designation on the tape, (b) carrying means for the tape adapted to be received in operating relationship by the tape handling apparatus, (c) an erasing means for erasing magnetic patterns from the tape, (d) dual position erase control means disposed on the tape handling apparatus and operative in a first one of two positions to disable the erasing means and ineffective to disable the erasing means when in the second position, (e) switch means disposed at a place on the carrying means so as to be operatively engaged with the erase control means when the carrying means is received in operating relationship on the tape handling apparatus, the switch means being movable between a primary position in which it causes the erase control means to assume the first position and a secondary position in which it causes the erase control means to assume the second position, and (f) electromagnetic means mounted on the tape handling apparatus and responsive to the first named means for placing the switch means in its primary position.

References Cited by the Examiner

UNITED STATES PATENTS

| | | | |
|---|---|---|---|
| 2,466,514 | 4/49 | Vogtborg | 179—100.2 |
| 2,549,071 | 4/51 | Dusek | 340—153 |
| 2,594,848 | 4/52 | Begun | 179—100.2 |
| 2,612,565 | 9/52 | Heller | 179—100.2 |
| 2,675,430 | 4/54 | Clarke | 179—100.2 |
| 2,733,300 | 1/56 | Menard | 179—100.2 |
| 2,798,554 | 7/57 | Smith | 340—174.1 |
| 2,817,072 | 12/57 | Chien et al. | 340—174.1 |
| 2,821,576 | 1/58 | Gaubert | 340—174.1 |
| 2,914,752 | 11/59 | MacDonald | 340—174.1 |
| 2,918,662 | 12/59 | Cox | 340—174.1 |
| 2,937,368 | 5/60 | Newby | 340—174.1 |

IRVING L. SRAGOW, *Primary Examiner.*